United States Patent
Topps

(10) Patent No.: US 10,104,899 B2
(45) Date of Patent: Oct. 23, 2018

(54) METHODS FOR PROCESSING MEAT USING PHOSPHATE FREE HIGH PH COMPOSITIONS CONTAINING SALT AND SODIUM CARBONATE

(71) Applicant: Chris Topps, San Juan Capistrano, CA (US)

(72) Inventor: Chris Topps, San Juan Capistrano, CA (US)

(73) Assignee: QST INGREDIENTS AND PACKAGING, INC., Rancho Cucamonga, CA (US)

( * ) Notice: Subject to any disclaimer, the term of this patent is extended or adjusted under 35 U.S.C. 154(b) by 0 days.

(21) Appl. No.: 14/928,339

(22) Filed: Oct. 30, 2015

(65) Prior Publication Data

US 2016/0050947 A1    Feb. 25, 2016

Related U.S. Application Data

(63) Continuation of application No. 13/904,829, filed on May 29, 2013, which is a continuation of application No. 12/847,806, filed on Jul. 30, 2010.

(51) Int. Cl.
| | | |
|---|---|---|
| A23B 4/027 | (2006.01) | |
| A23L 13/00 | (2016.01) | |
| A23L 13/40 | (2016.01) | |
| A23L 13/50 | (2016.01) | |
| A23L 13/70 | (2016.01) | |

(52) U.S. Cl.
CPC .............. *A23B 4/027* (2013.01); *A23L 13/03* (2016.08); *A23L 13/428* (2016.08); *A23L 13/55* (2016.08); *A23L 13/72* (2016.08); *A23V 2002/00* (2013.01)

(58) Field of Classification Search
CPC .... A23L 1/318; A23L 1/31427; A23L 1/3182; A23L 1/31445; A23L 1/31; A23L 1/31436; A23L 1/31463; A23B 4/20; A23B 4/027; A23V 2002/00; A23V 2200/02; A23V 2200/10
USPC .......... 426/332, 295, 533, 643, 644, 652, 92
See application file for complete search history.

(56) References Cited

U.S. PATENT DOCUMENTS

| | | |
|---|---|---|
| 3,155,303 A | 11/1964 | Fenkel |
| 3,556,807 A | 1/1971 | Woo |
| 3,563,445 A | 2/1971 | Clayton |
| 4,343,821 A | 8/1982 | Rose |
| 4,683,139 A | 7/1987 | Cheng |
| 4,818,548 A | 4/1989 | Cheng |
| 5,344,665 A | 9/1994 | Kanayama |
| 6,020,012 A | 2/2000 | Kauffman et al. |
| 6,713,108 B2 | 3/2004 | Roth |
| 6,869,632 B2 | 3/2005 | Kauffman et al. |
| 6,899,908 B2 | 3/2005 | Roth |
| 7,001,630 B2 | 2/2006 | Bender |
| 7,060,309 B2 | 6/2006 | Paterson et al. |
| 2002/0155201 A1 | 10/2002 | Okada et al. |
| 2003/0054047 A1 | 3/2003 | DelDuca et al. |
| 2004/0219283 A1 | 11/2004 | Evans |
| 2009/0004353 A1 | 1/2009 | Topps |

FOREIGN PATENT DOCUMENTS

| | | |
|---|---|---|
| EP | 0209268 | 1/1987 |
| JP | 2000125760 | 5/2000 |
| JP | 2007312771 | 12/2007 |
| WO | WO 2007070686 A1 * | 6/2007 |
| WO | 2009002554 | 12/2008 |

OTHER PUBLICATIONS

Joseph Sebranek and James Bacus, Natural and Organic Cured Meat Products: Regulatory, Manufacturing, Marketing, Quality and Safety Issues, Mar. 2007, American Meat Science Association White Paper Series.*
Sodium Carbonate, SIDS Oct. 2002, UNEP Publication, pp. 1-85.
United States department of Agriculture, Processing Inspector's Calculations Handbook , pp. 1-142 (1995).

\* cited by examiner

*Primary Examiner* — Vera Stulii
(74) *Attorney, Agent, or Firm* — Gordon Rees Scully Mansukhani LLP; Kathryn K. Hull

(57) ABSTRACT

The present invention is in the field of processing meat. More particularly, the present invention relates to a method of processing meat to enhance moisture retention and flavor during storage and cooking by infusing the meat with an aqueous composition containing salt and sodium carbonate at a pH in the range of from 10.1 to 11.3.

15 Claims, No Drawings

METHODS FOR PROCESSING MEAT USING PHOSPHATE FREE HIGH PH COMPOSITIONS CONTAINING SALT AND SODIUM CARBONATE

CROSS REFERENCE TO RELATED APPLICATIONS

This application is a continuation of U.S. Ser. No. 13/904,829, filed on May 29, 2013, which is a continuation of U.S. Ser. No. 12/847,806, filed on Jul. 30, 2010. The entire disclosures of all related applications are incorporated by reference herein.

TECHNICAL FIELD

The present invention is in the field of processing meat. More particularly, the present invention relates to a method of processing meat to enhance moisture retention during storage and cooking by infusing the meat with a liquid brine composition containing salt and sodium carbonate at a pH in the range of from 10.1 to 11.3.

BACKGROUND OF THE INVENTION

By weight, water constitutes the largest portion of a food animal. The amount of water is usually found in the range 70-80%. Part of this water is found in free form while the rest is bound to proteins, especially myofibrillar proteins, through charged and polar groups. The amount of immobilized water depends on the available space within the myofibrillar structure and, in fact, the volume of myofibrils is decisive to the water-binding capacity of the muscle. Some variations exist between muscles due to the types of muscle fibers, degree of fiber contraction and pre-rigor p1I. The water retention also depends on the ultimate pH reached after rigor mortis and this will have a strong influence on the activity of muscle enzymes involved in proteolysis and lipolysis during ageing and further processing. Variations may be also expected between animal species and age at slaughter.

From the time an animal is slaughtered, its carcass begins to lose water, which results in a shrinkage, or weight loss, of the meat. This weight loss, which begins at slaughtering, continues through the refrigeration and butchering steps in meat processing, and also continues during cooking. The weight loss results in the meat generally becoming tougher, there is less amount of product to sell, and that product is of diminished quality. Furthermore, cooking shrinkage results in a still smaller amount of cooked meat served for ultimate consumption.

Before reaching the consumer, most foods are processed in some way. For example, meat products are separated from unusable or undesirable elements or components, ground or chopped, mixed or blended, and can be frozen for distribution.

Meat treatments are well known for enhancing the appearance and flavor of meat products for use by consumers. For example, the pH of a meat carcass immediately decreases due to glycolysis by muscle tissues. Accordingly, one of the most common meat treatments consists of using a phosphate to increase the pH (U.S. Pat. No. 4,818,528). The pH can also be increased to prevent microbes from contaminating the meat. See, for example, U.S. Pat. Nos. 6,899,908 and 6,713,108. This process returns the meat to a more pre-slaughter state. However, many such treatments result in diminishing water retention, and can also result in meat having, an "over processed" look and flavor.

The application of sodium carbonate in a vacuum is another method of treating meat. Sodium carbonate, like phosphates, serves as a pH buffer (U.S. Pat. No. 5,939,112). However, sodium carbonate has been described as being less effective for enhancing water retention in meat than other treatments such as alkali silicates (U.S. Pat. No. 7,001,630).

In the meat industry, it is desirable for meat products to retain moisture during storage and cooking. This is true for all meat products, such as pork, lamb, beef and poultry, which may contain as much as 75% moisture. In addition to retention of natural moisture, i.e., water and fat, it is desirable that the meat retain any moisture added during meat processing. The ability to maintain total moisture enhances the ability of the meat products to retain flavor, and also enhances juiciness and tenderness of the cooked product. Loss of liquid reflects loss of water and liquid fat, which collectively make up the juice of the meat. Shrinkage during cooking is caused by a loss of liquid, and can be measured by weight loss of the meat. In addition, the overall appearance of the meat is not enhanced and quality is diminished when excessive moisture is lost during cooking. For example, untreated poultry fibers often appear dry and stringy after cooking, whereas treated poultry fibers exhibit a more natural looking appearance.

Phosphates are also commonly used in the meat industry to raise the pH of the meat to increase the water holding capacity of the protein fibers. One such process is described in U.S. Pat. No. 4,818,528 that teaches treating and packaging fresh meat to retain the fresh meat color and to postpone microbial deterioration and spoilage. However, phosphate treatments can have a tendency to diminish texture, appearance and flavor of meat treatments. Meats that have undergone phosphate treatments are commonly known in the meat industry as being "over-processed" or having a "processed" look and/or taste.

Other meat treatments are also known in the industry. For example, published U.S. Patent Application No. 2004/0219283 describes the use of trehalose to treat uncooked meat in order to decrease shrinkage during cooking. The use of sodium bicarbonate in the meat treatment industry has also been previously reported. For example, U.S. Pat. No. 7,060,309 describes the use of sodium bicarbonate under a vacuum to reduce the number of holes in subsequently cooked meat. In addition, U.S. Pat. No. 6,020,012 describes the use of sodium bicarbonate as an injectable treatment to reduce the rate of pH decline.

Sodium carbonate has been described before for use in different industries, such as water softening, etc. In most instances, it is used to buffer the pH of liquid foodstuffs. Sodium carbonate has also been described for use in the meat industry as one of many useful alkalis. In U.S. Pat. No. 5,939,112, a composition optionally containing sodium carbonate at a pH of 5 to 10, and preferably from 6.5 to 8.5, is described for treating meat at a temperature of 20° C. or lower. Higher temperatures and pH are discouraged because they would toughen the meat.

Accordingly, there remains a need to provide methods for processing meat to enhance moisture and flavor retention using phosphate free compositions. The present invention involves processing meat with a liquid brine composition containing salt and sodium carbonate (as well as optional ingredients) at a pH in the range from 10.1 to 11.3.

SUMMARY OF THE INVENTION

The present invention relates to a method of processing uncooked meat to enhance flavor and moisture retention comprising the steps of: a) preparing a dry composition comprising from 0.1 to 3.0 parts of salt per 100 parts of the uncooked meat and from 0.1 to 0.5 parts of sodium carbonate per 100 parts of the uncooked meat; b) dissolving the dry composition in an amount of aqueous liquid to form a phosphate free liquid brine composition; c) providing a portion of uncooked meat having a given weight, wherein the uncooked meat is selected from the group consisting of: poultry, pork, lamb and beef; and d) treating the portion of uncooked meat with a 10% to 30% w/w addition rate of the liquid brine composition to form an uncooked processed meat with a predetermined amount in parts of salt and sodium carbonate in 100 parts of the uncooked processed meat; wherein the amount of aqueous liquid used in step b) is calculated from the given weight of the uncooked meat, the addition rate of the liquid brine composition, and the predetermined amount in parts of salt and sodium carbonate in 100 parts of the uncooked meat; and wherein the liquid brine composition has a pH from 10.1 to 11.3.

The salt used in the present method may be sodium chloride, or it may also be a mixture of sodium chloride, potassium chloride and magnesium chloride. In one embodiment, the salt is low sodium sea salt, which also means that it has 45% or less sodium by nutritional standard.

In one embodiment, the pH of the liquid brine composition is between 10.1 and 10.7. In another embodiment, the pH of the liquid brine composition is between 10.3 and 10.7.

Step d) may be carried out by any known method of infusing liquid into meat, such as by marinating, injection or tumbling the uncooked meat with the liquid brine composition.

The liquid brine composition may also include a number of optional ingredients, such as from 0.05 to 2.5 parts of saccharide per 100 parts of the untreated meat, and/or from 0.001 to 0.1 parts of natural flavorings per 100 parts of the untreated meat.

The liquid brine composition may also include from 0.1 to 0.5 parts nitrites per 100 parts of uncooked meat. The nitrites may be "natural" nitrites, i.e. they are derived from vegetables or fruits. The nitrites may be added to the dry ingredients or added in liquid form to the liquid brine composition.

Other aspects of the invention are described throughout the specification.

DETAILED DESCRIPTION OF THE PREFERRED EMBODIMENTS

The present invention is in the field of processing meat. More particularly, the present invention relates to a method of processing meat to enhance moisture and flavor retention during storage and cooking by infusing the meat with an aqueous composition containing salt and sodium carbonate at a pH in the range of from 10.1 to 11.3 Enhanced moisture retention results in improved texture, color, and tenderness of the meat.

It would be thought that raising the pH of the meat by treating the meat with a higher pH (i.e., above 10) liquid brine solution would toughen or denature the protein. However, this has been found not to be true using the compositions of the present invention. In fact, at the pH range of 10.1 to 11.3, the meat retains a greater amount of moisture during storage, and therefore results in higher cooked yields. In addition, the cooked meat exhibits a non-processed texture. It has been found that at these higher pH levels, and in particular between 10.3 and 10.7, water, fats, tissue fibers and protein bind much faster and more permanently than at a lower pH. This has both economical and energy advantages when used, for example, to treat boneless, skinless chicken breast.

Many meat processors tumble boneless skinless chicken breast at some point during meat processing. Other meat cuts may not be tumbled due to the type of the cut and species, in which case they may be injected instead. When using boneless skinless chicken breast, for example, the tumble times required to fully infuse the meat were reduced by about 35%, which saves energy and processing time. Specifically, with regard to a 5,000 pound tumbler that normally would tumble boneless skinless chicken breast at a 20% addition rate for about 45 minutes, using the methods of the present invention, the tumble times were reduced to about 30 minutes.

In one embodiment, the method of the present invention is practiced using liquid brine compositions comprising sodium carbonate and salt at a pH of between 10.1 and 11.3. Such compositions may also include other optional ingredients, such as saccharide and natural flavorings.

Terms

In the description that follows, a number of terms used in the field of meat processing and packaging are extensively utilized. In order to provide a clear and consistent understanding of the specification and claims, including the scope to be given such terms, the following non-limiting definitions are provided.

When the terms "one," or "an" are used in this disclosure, they mean "at least one" or "one or more," unless otherwise indicated.

The term "aqueous liquid" as used herein refers to any water-based liquid used to dissolve the dry composition into solution. Aqueous liquids include water, broths (vegetable or animal), natural juices (vegetable, animal or fruit) and blood.

The term "broth" or "broths" as used herein refer to the water in which meat, fish and/or vegetables have been boiled.

The term "dry composition" as used herein refers to a mixture of dry ingredients for processing meats.

The term "cooked weight" as used herein refers to the weight of the cooked meat product after reaching the desired internal temperature (or "cooked temperature") safe for human consumption.

The term "green weight" as used herein refers to the weight of the meat product before processing and cooking.

The term "ingoing percentage" refers to the amount of the dry composition calculated as a percentage of the meat's weight. It is the weight of the dry composition divided by the weight of the liquid brine composition multiplied by the percent addition rate (i.e. Ingoing percentage=((dry composition (lbs.)/total weight of liquid brine composition (lbs.))×(% addition rate)).

The term "injection" as used herein refers to introducing the liquid brine composition into meat by a hollow needle.

The term "liquid brine composition" as used herein refers to the dry composition dissolved in the aqueous liquid such as water, natural juices, broth or blood.

The term "natural juices" as used herein refers to the liquid naturally contained in meat, vegetable or fruit.

The term "natural flavorings" as used herein refers to ingredients such as rosemary extracts, etc. Natural flavorings are foodstuffs considered by the United States Department of Agriculture ("USDA") and Federal Drug Administration ("FDA") as natural ingredients.

The term "optional ingredients" as used herein refers to ingredients used in conjunction with or individually with the present invention for function, flavor, and or color.

The term "natural curing agent" refers to a plant based nitrite derived from plant material comprising nitrate by a process of preparing or converting the plant material substance. One such plant based curing agent is celery juice or powder. The curing agent can be used to preserve or cure meat.

The term "natural cure accelerator" refers to a natural plant substance that when combined with the natural curing agent works like a color enhancer. It aids in setting the cure color associated with cured meats like ham. One such plant based substance is natural cherry powder.

The term "percent addition rate" as used herein refers to the amount of the liquid brine composition that is applied to the meat during processing. For example, if a 12% addition rate is desired for a 100 pound portion of untreated meat, the meat is processed with a liquid brine composition such that the meat absorbs 12 pounds of the liquid brine composition.

The term "pumped weight" as used herein is determined by adding together the green weight plus the weight of the liquid brine solution retained by the meat. For example, 100 pounds of meat treated with the liquid brine composition at an addition rate of 20% (i.e. 20 pounds of liquid brine composition) yields 120 pounds of pre-cooked meat, and represents the meat's "pumped weight."

The term "yield of the meat" or "yield" as used herein refers to the ratio of the cooked weight to the green weight of the meat, and is usually expressed as a percent. Preferably, the yield is 8% or better for meat processed according to the method of the present invention when compared to unprocessed meat.

The term "thumb and fork" pressure test is used to measure the firmness of the cooked meat, and to determine whether juices from the meat come out under slight pressure. To perform the thumb and fork pressure test, a fork is placed in the non-dominate hand and pressure is gently applied to the top of the meat.

The term "unprocessed meat" as used herein refers to meat that is in its natural state after being slaughtered or harvested.

The term "purge" as used herein refers to the moisture emitted from meat after the slaughtering of an animal and the moisture emitted after processing.

The term "tumbler" as used herein refers to a vessel that rotates in a circular motion, at a set speed and time, to facilitate uptake of the liquid brine composition by the meat and usually under vacuum. The term "tumble time" as used herein refers to the amount of time the meat is in the tumbler for processing.

The term "yield" as used herein refers to the ratio of cooked weight to careen (uncooked) weight. This ratio is greater for processed cooked meat than for unprocessed meat cooked under the same conditions (i.e., same green weight, time and temperature).

The term "parts" refers to, for example, parts per million, and is usually used to express the ingoing percentage of dry ingredients. For example:

1 ppm=1/1,000,000=0.000001=0.0001%

1000 ppm=1,000/1,000,000=0.001=0.1%

Thus, 0.3 parts per 100 parts of uncooked meat is equivalent to 3000 parts per million of the ingredient in the treated meat. To identify the parts per million of an ingredient in an aqueous solution, the calculation is thus:

individual ingredient/total of brine solution X addition rate=ingoing parts per million in the treated meat Dry Composition The liquid brine compositions of the present invention comprise salt and sodium carbonate alone or in combination with optional ingredients, such as saccharides and natural flavorings.

The salt that is used in the practice of the present invention may be from any source, such as purified sodium chloride, sea salt, and low sodium sea salt, or any combination thereof. In one embodiment, the composition comprises low sodium sea salt as the only salt. The amount of salt in the liquid brine composition is between 0.1 and 3.0 parts per 100 parts of uncooked meat. In one embodiment, the amount of salt is from 0.6 to 1.5 parts per 100 parts of meat, which is the same as saying that the processed meat consists of 6,000 to 15,0000 parts per million (ppm) of salt.

Table salt, which is essentially all sodium chloride, has about 590 milligrams of sodium per 1.5 grams of salt. Low sodium sea salt has about 325 mg of sodium per 1.5 grains of salt. Low sodium sea salt is salt that is extracted from seawater using known methods. Many sources of low sodium sea salt are commercially available. Sea salt is generally regarded as being low in sodium if it contains 40% less sodium than sodium chloride, and in many instances may contain 50% or even 70% less sodium. Low sodium sea salt is characterized as being a blend of sodium chloride, magnesium chloride and potassium chloride, and contains trace minerals found in seawater that are regarded as being beneficial nutrients.

Sodium carbonate, $Na_2CO_3$, is readily available from commercial sources or can be manufactured using known methods. In one embodiment, the liquid brine composition comprises sodium carbonate as the only alkali.

Unlike sodium bicarbonate, which is commonly used as a buffering agent in a variety of commercial foodstuffs, sodium carbonate often raises the pH to an undesirable level and is therefore not the alkali source of choice for processing meat. It is commonly thought that the effervescent qualities of sodium bicarbonate make it a better choice over sodium carbonate to enhance moisture retention. However, in the practice of the present invention, this is not the case. Sodium carbonate, at the levels disclosed in the present invention, is unique in its ability to achieve a desired without compromising flavor or other qualities of the meat. The amount of sodium carbonate present in the composition is from 0.1 to 0.5 parts per 100 parts of the uncooked meat, which is equivalent to the processed meat having 1,000 to 5,000 ppm sodium carbonate.

In addition, sodium carbonate has two pKa's based on the following two reactions in equilibrium:

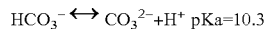

$$HCO_3^- \leftrightarrow CO_3^{2-} + H^+ \quad pKa=10.3$$

$$CO_2 + H_2O \leftrightarrow HCO_3^- + H^+ \quad pKa=6.33$$

By keeping the pH at or near the pKa of 10.3, and more preferably from 10.3 to 10.7, the carbonate ion is abundant and acts to mildly dissociate proteins, but not completely denature them. Accordingly, this pH range is ideal for meat processing.

Saccharides that may be used in the composition come in a variety of forms including monosaccharides, disaccharides and polysaccharides. They may be utilized to enhance flavor or as a bulking agent. A single type of saccharide or a combination of saccharides may be used in the composition. The types of monosaccharides include glucose, fructose, mannose, galactose, ribose and xylose. Disaccharides include sucrose, lactose, maltose, cellobiose and isomaltose. Polysaccharides include, maltodextrin, dextran, maltodextrose, dextrose, cellulose and starch, as well as polymers of glucose, fructose, mannose, galactose, ribose and xylose. Saccharides may come from a variety of sources ranging from processed table sugar to less processed forms, such as evaporated cane juice, evaporated cane syrup, turbinado sugar, cane extracts or other sweeteners. The amount of saccharide present in the liquid brine composition is usually from 0.05 to 2.5 parts per 100 parts of uncooked meat, which is the same as saying the processed meat contains 500 to 25,000 ppm of saccharide.

Additional optional ingredients that also may be used for function, flavor, and or color in the composition include but are not limited to; phosphates, nitrites, nitrates, lactates, acetates, starches, diacetates, spices, spice extractives, carageenans, sodium bicarbonate, sugars, dextrins, maltodextrin, ammonium hydroxide erythorbate, ascorbic acid salts, antioxidants, vinegars, gums, broths, alginates, oil extracts and coloring agents proteins, such as wheat, milk or soy protein powders may also be included in the composition.

Natural flavorings also may be used in the composition. Many of these flavorings are listed in the USDA and/or FDA guidelines as being considered "natural". The amount of natural flavorings in the liquid brine composition may be from 0.001 to 0.1 parts per 100 parts of uncooked meat, which is the same as saying the processed meat contains 10 to 1,000 ppm of natural flavorings.

Liquid Brine Composition

The preparation of the liquid brine composition for processing the uncooked meat begins with preparing a dry composition and thereafter dissolving the dry composition in aqueous liquid, to form a liquid brine composition of the desired concentration. Correspondingly, each of the ingredients may be systematically added to the aqueous liquid and dissolved into solution. Aqueous liquids for dissolving the dry composition include, for example, water, a fruit juice, a vegetable juice or broth, a meat juice or broth and blood.

The liquid brine composition is formulated to a specified concentration of each ingredient. The pH of the liquid brine composition may range (or be adjusted with acid or base to range) from 10.1 to 11.3. More specifically, the pH may range from 10.1 to 10.7. In one embodiment, the pH may be from 10.3 to 10.7, such as 10.3, 10.4, 10.5, 10.6 or 10.7.

The dry composition is formulated by mixing sodium chloride and sodium carbonate together as a dry blend, along with any optional ingredients. This dry blend is then dissolved in aqueous liquid such that the dry blend is fully dissolved into a liquid brine composition. (Please note that the optional ingredients may be added to the formulation as a dry ingredient, or as a liquid ingredient, either as part of the aqueous solution in which the dry ingredients are dissolved, or separately).

In the practice of the present invention the salt and sodium carbonate are mixed together to achieve a final concentration in the processed meat of: from 0.1 to 3.0 parts of salt per 100 parts of the uncooked meat and from 0.1 to 0.5 parts of sodium carbonate per 100 parts of the uncooked meat.

This means that the ratio of sea salt to sodium carbonate may range from:

$$\frac{.1 \text{ (the low end salt)}}{.5 \text{ (the high end of sodium carbonate)}} \text{ TO}$$

$$\frac{3 \text{ (the high end salt)}}{.1 \text{ (the low end of sodium carbonate)}}$$

Accordingly, the ratio of salt to sodium carbonate may vary from 0.2 to 30. As would be expected, this ratio can be varied and optimized to achieve the desired enhancement to moisture retention, flavor such as saltiness), and other desirable qualities.

The amount of dry composition ingredients desired in the liquid brine composition may also be calculated based upon the desired percent addition rate and desired ingoing percentage of salt and sodium carbonate. The percent addition rate refers to the amount of the liquid brine composition that is applied to the meat during processing. For example, if a 12% addition rate is desired for a 100 pound portion of meat, the meat is processed with sufficient liquid brine composition such that the meat absorbs 12 pounds of the liquid brine composition.

Correspondingly, the ingoing percentage of dry ingredients refers to the amount of the dry composition that is calculated as a percentage of the meat's weight. The volume of liquid brine composition may vary and be optimized depending on the storage capacity of the machinery used to process the meat. However, where a particular percent addition rate and ingoing percentage are desired, any amount of liquid brine composition may be added so long as the dry composition is fully dissolved by the aqueous liquid.

Therefore, the exact amount of dry composition may be calculated based upon a desired addition rate and ingoing percentage rate, wherein the amount of aqueous liquid is determined based upon the desired processing method. Accordingly, the amount of dry composition can be calculated using the following formula:

$$\frac{X+Y}{X+Y+Z} \times \text{percent addition rate} = \text{ingoing percentage}$$

wherein X is the amount of salt;
wherein Y is the amount of sodium carbonate; and
wherein Z is the amount of aqueous liquid to be used.

The desired "salinity" of the processed meat can also be determined by routine optimization. One optimization method is varying the concentration of salt in the composition. For example, a number of compositions containing different salt concentrations can be applied to a particular type of meat using a particular processing method. The meat is then cooked and taste tested for the desired amount of salinity.

Another optimization method is to apply a given liquid brine composition for varying time periods, thereby adjusting the amount of the composition applied to the meat. The meat is then cooked and taste tested for the desired amount of salinity. These optimization methods may also be applied to adjust the amount of natural flavorings, artificial flavorings and sweetness (i.e. saccharide concentration) of the meat in order to obtain the desired taste.

The amount of saccharide in the processed meat product may range from 0.05 parts to 2.50 parts per 100 parts of meat. In one embodiment, the amount of saccharide is from 0.1 parts to 1.0 parts per 100 parts of meat.

The amount of natural flavorings in the processed meat product may comprise from 0.001 parts to 0.1 parts per 100 parts of meat. In one embodiment, the amount of natural flavorings ranges from 0.01 parts to 0.1 parts per 100 parts of meat.

Types of Meat

The methods and compositions of the present invention may be used to process a variety of meats including, but not limited to, poultry, lamb, beef and pork. While muscle tissue is the most common meat processed for consumption, organ tissue can also be processed with the methods and compositions of the present invention.

Meat Processing

In the practice of the present invention, the liquid brine composition is applied or "infused" by any suitable means, including injection, dipping, immersion, infusion, perfusion, spraying, tumbling, rubbing or marinating, and may take place under vacuum, atmospheric pressure or above, or by any other suitable means. In addition, application may occur at ambient temperature, in the cold or at elevated temperatures.

Following application of the present invention aqueous solution, the meat product may be further processed by packaging, chilling, freezing, etc., prior to being cooked.

Cooking of the meat product may be accomplished by any known method, such as but not limited to, conventional oven, industrial smoke house or steam house, frying, boiling, cooking in a bag and/or casings.

Sample Calculations

The following sample calculations demonstrate how to calculate the exact amount of dry composition comprised of sodium chloride and sodium carbonate that needs to be dissolved in aqueous liquid in order to achieve a desired range of sodium chloride and sodium carbonate in the meat. The formula for determining the appropriate amounts of sodium chloride and sodium carbonate is provided below:

$$\frac{X+Y}{X+Y+Z} \times \text{percent addition rate} = \text{ingoing percentage}$$

wherein X is the amount of sodium chloridet;
wherein Y is the amount of sodium carbonate; and
wherein Z is the amount of aqueous liquid to be used.

Using this formula, the amount of dry composition (X+Y) can be used to calculate the ingoing percentage based upon a desired percent addition rate and desired ingoing percentage of sodium chloride and sodium carbonate in any volume of aqueous liquid.

For example, if 100 pounds of meat are processed according to the present invention and the desired amounts of sodium chloride and sodium carbonate in the processed meat are 1 pound of sodium chloride per 100 pounds of meat and 0.2 pounds of sodium carbonate per 100 pounds of meat, then the ingoing percentage is 1.2% (e.g. 1 pound of sodium chloride+0.2 pounds of sodium carbonate=1.2 pounds of sodium chloride and sodium carbonate in 100 pounds of processed meat, or 1.2%). Thereafter, if a 15% addition rate is desired and the dry composition is dissolved in 13.8 pounds of aqueous liquid, the calculation for how much dry composition is used is as follows:

$$\frac{X+Y}{X+Y+13.8 \text{ lbs aqueous liquid}} \times 15\% = 1.2\%$$

wherein X is the amount of sodium chloride; and
wherein Y is the amount of sodium carbonate.

$$\frac{1+.2}{1+.2+13.8 \text{ lbs aqueous liquid}} \times 15\% = 1.2\%$$

$$\frac{1.2 \text{ lbs}}{15 \text{ lbs aqueous composition}} \times 15\% = 1.2\%$$

In another example, if 20 pounds of meat are processed according to the present invention and the desired amounts of sodium chloride and sodium carbonate in the processed meat are 0.3 pounds of sodium chloride per 20 pounds of meat and 0.05 pounds of sodium carbonate per 20 pounds of meat, then the ingoing percentage is 1.75% (e.g 0.3 pounds of sodium chloride+0.05 pounds of sodium carbonate=0.35 pounds of sodium chloride and sodium carbonate in 20 pounds of processed meat, or 1.75%). Thereafter, if a 12% addition rate is desired and the dry composition is dissolved in an aqueous liquid, the calculation for how much aqueous liquid is used is as follows:

$$\frac{X+Y}{X+Y+Z \text{ aqueous liquid}} \times 12\% = 1.75\%$$

wherein X is the amount of sodium chloride;
wherein Y is the amount of sodium carbonate; and
wherein Z is the amount of aqueous liquid to be used To determine the amount of aqueous liquid, the following equation is used:

20 lbs of meat times the addition rate minus the dry composition is equal to the aqueous liquid.

(20 lbs×12%)−0.35=2.05 lbs aqueous liquid

Therefore, $$\frac{X+Y}{X+Y+Z} \times \text{percent addition rate} = \text{ingoing percentage}$$

wherein X is the amount of sodium chloride;
wherein Y is the amount of sodium carbonate; and
wherein Z is the amount of aqueous liquid to be used.

$$\frac{.3+.05}{.3+.05+2.05 \text{ lbs aqueous liquid}} \times 12\% = 1.75\%$$

$$\frac{.35}{2.4 \text{ lbs aqueous composition}} \times 12\% = 1.75\%$$

Therefore, in order to treat 20 pounds of meat, a liquid brine composition of 2.4 pounds is needed, where 2.05 lbs is the aqueous liquid and 0.35 pounds is the dry composition. 20 pounds of meat is then processed at a percent addition rate of 12% to achieve a 1.75% ingoing percentage of dry ingredients.

In a different example, if 238 pounds of meat are processed according to the present invention and the desired amounts of sodium chloride and sodium carbonate in the processed meat are 0.6 pounds of sodium chloride per 100 pounds of meat and 0.2 pounds of sodium carbonate per 100 pounds of meat, then the ingoing percentage is 0.8% (e.g. 0.6 parts of sodium chloride+0.2 parts of sodium carbonate=0.8% ingoing percentage of dry composition. Thereafter, if a 18% addition rate is desired and the dry composition is dissolved in an aqueous liquid, the calculation for how much dry composition and aqueous liquid is used is as follows:

The amount of dry ingredients is equal to pounds of meat times parts (%) of ingredient.
For sodium chloride, 238 lbs of meat X 0.6%=1.428 lbs
For sodium carbonate, 238 lbs of meat X 0.2%=0.476 lbs,
Dry composition is equal to X+Y, so 1.428+ 0.476=1.904 lbs To determine the amount of aqueous liquid, the following equation is used:

Pounds of meat times the addition rate minus the dry composition is equal to the aqueous liquid.

(238 lbs×18%)−1.904 lbs=40.936 lbs aqueous liquid

Therefore, $$\frac{X+Y}{X+Y+Z} \times \text{percent addition rate} = \text{ingoing percentage}$$

wherein X is the amount of sodium chloride;
wherein Y is the amount of sodium carbonate; and
wherein Z is the amount of aqueous liquid to be used.

$$\frac{1.428 + 0.476}{1.428 + 0.476 + 40.936 \text{ lbs aqueous liquid}} \times 18\% = 0.8\%$$

$$\frac{1.904}{42.84 \text{ lbs aqueous composition}} \times 18\% = 0.8\%$$

Based on the above equation and after solving for pounds of sodium chloride, sodium carbonate and the aqueous liquid the result to treat 238 pounds of meat is: 1.428 lbs of sodium chloride (equal to 0.6%) and 0.476 lbs of sodium carbonate (equal to 0.2%) for a total of 0.8% ingoing of dry ingredients and 40.936 lbs of aqueous liquid. For an 18% addition, 1.904 lbs of dry ingredients plus 40.936 lbs of aqueous liquid is used, which is equal to 42.84 lbs. 238 lbs of meat plus 42.84 lbs of liquid brine composition equals 280.84 lbs. 238 lbs pounds of meat is then processed at a percent addition rate of 18% to achieve a 0.8% ingoing percentage.

EXAMPLES

Example 1: Preparation of an Exemplary Liquid Brine Composition

A liquid brine composition that is useful in the practice of the present invention is be prepared as set forth below:

TABLE 1

Exemplary Aqueous Composition Formulation

| Ingredient | Parts per 100 parts of Uncooked, Untreated Meat |
|---|---|
| Sodium Carbonate | 0.1 to 0.5 parts |
| Saccharide (Evaporated Cane Sugar) | 0.45 to 2.5 parts |
| Sodium Chloride | 0.1 to 3 parts |
| Natural Flavoring (Rosemary Extract) | 0.001 to 0.1 parts |
| Water | Sufficient for Dilution for 10%-30% addition rate to untreated meat |

A liquid brine composition from Table 1 is prepared by mixing the above ingredients. The water temperature is about 34° F. Mixing is continued until all the ingredients are dissolved. The liquid brine composition is then left to sit for 15-20 minutes. During mixing and preparation, the pH of the liquid brine composition fluctuates above 10.5 and the final pH of the aqueous solution is between 10.1 to 10.7.

Sodium carbonate and saccharides are supplied from Cooperative Inc., Los Angeles, Calif. Sodium chloride is obtained from A&B Ingredients, Los Angeles, Calif. Natural flavorings such as rosemary extracts are obtained from Kalsec Flavor Company, Los Angeles, Calif.

Example 2: Meat Processing

To calculate the amount of the liquid brine composition to be applied to the meat, the weight of the meat is multiplied by the desired final ingoing percentage of the liquid brine composition. For example, if a 20% addition rate is desired, 20 pounds of the liquid brine composition solution is added to 100 pounds of meat. This calculation can be found in the USDA Inspectors Handbook Published in 1995, by the United States Department of Agriculture.

The "ingoing percent of ingredients" is a measure of the amount of ingredients with which the meat is being treated. It is calculated by taking the amount of the ingredients divided by the total liquid brine composition, times the addition rate. For example, an addition of 0.75 pounds of the ingredients and 10 pounds of water at a desired addition rate of 20% would be equal 1.395% ingoing ingredients.

TABLE 2

Examples of Percent of Ingoing Added to Meat

| Type of Meat | Desired Addition Rate | Pounds of (PI) Ingredient | Water in pounds | Total (lbs) Liquid Brine | Ingoing Percent of Ingredients |
|---|---|---|---|---|---|
| 4 oz chicken breast, whole* | 20% | 0.75 | 10 | 10.75 | 1.4% |
| 6 oz chicken breast, whole | 18% | 0.9 | 10 | 10.9 | 1.48% |
| 8 oz chicken breast, whole | 15% | 1.1 | 10 | 11.1 | 1.48% |
| 4 oz chicken breast, whole | 12% | 1.43 | 10 | 11.43 | 1.5% |
| 6 oz chicken breast, whole | 10% | 1.8 | 10 | 11.8 | 1.53% |
| 8 oz chicken breast, whole | 8% | 2.3 | 10 | 12.3 | 1.5% |
| 4 oz chicken breast, cut** | 20% | 0.5 | 10 | 10.5 | 0.95% |
| 6 oz chicken breast, cut | 18% | 0.6 | 10 | 10.6 | 1% |
| 8 oz chicken breast, cut | 15% | 0.7 | 10 | 10.7 | 0.98% |
| 16 oz chicken breast, cut | 12% | 0.9 | 10 | 10.9 | 1.0% |
| 32 oz chicken breast, cut | 10% | 1.1 | 10 | 11.1 | 1.0% |
| 4 oz pork loin chop or roast | 20% | 0.25 | 10 | 10.25 | 0.48% |
| Goz pork loin chop or roast | 18% | 0.3 | 10 | 10.3 | 0.52% |
| 8 oz pork loin chop or roast | 15% | 0.31 | 10 | 10.31 | 0.45% |
| I 6 oz pork loin chop or roast | 12% | 0.4 | 10 | 10.4 | 0.46% |
| 32 oz pork loin chop or roast | 10% | 0.56 | 10 | 10.56 | 0.53% |
| 48 oz beef flap meat | 20% | 1 | 10 | 11 | 1.8% |

TABLE 2-continued

Examples of Percent of Ingoing Added to Meat

| Type of Meat | Desired Addition Rate | Pounds of (PI) Ingredient | Water in pounds | Total (lbs) Liquid Brine | Ingoing Percent of Ingredients |
|---|---|---|---|---|---|
| 48 oz beef strip loin | 15% | .75 | 10 | 10.75 | 1.04% |
| 48 oz beef eye of round | 20% | 1.2 | 10 | 11.12 | 2.14% |
| 48 oz beef roast | 25% | 1 | 10 | 11 | 2.27% |

Initial Observations

The chicken and solution were placed into a tumbler. A tumbler is a vessel with a cylindrical shape, the interior of which has veins or blades in order to create friction while the vessel is turning or tumbling. A vacuum was then applied to the contents of the tumbler. The chicken was then tumbled at a revolution rate of about 6 to 10 revolutions per minute in a 500 pound tumbler for about 30 minutes.

After the meat was in the vacuum tumbler, it was cooked in a conventional oven. The boneless skinless chicken breast; untreated, treated with the phosphate composition or treated with the high pH liquid brine composition (the present invention) was placed on a rack in a standard cooking dish. The meat was cooked to an internal temperature of 175-180° F. After cooking, the chicken breast was removed from the oven and placed on a cutting board.

After the chicken breast had cooled for approximately 10 minutes, the chicken breast was cut in one of two different ways. The meat was cubed to a size of about ½ inch by ½ inch, in the other way, the meat was sliced the long ways in about ¼ inch thick pieces to create a fajita-style or Philly Steak-style appearance. After the meat was cubed, it was examined for moisture content. It was observed that the chicken treated with the present invention had very little of the moisture weeping during cooking. The thumb and fork pressure test was used to measure the firmness of the cooked meat, and to determine whether juices from the meat were released under slight pressure. The cubed meat was firm and had an excellent response to thumb and fork pressure. The meat cubes sprang back into the cubed shape without changing the natural appearance or loosing moisture. In contrast, the untreated meat remained almost flat, and the meat treated with the Phosphate Composition sprang back slightly, but released large dollops of moisture and did not hold the desired cubed shape.

Freezing and Thawing

To simulate the effect of cooked meat undergoing a freezing followed by further processing at a later date, the untreated cubed chicken was frozen for seven days and then thawed at 37° F. for about one full day. Treatment and cooking was performed as described above. The untreated meat had a tough, chewy and dry mouth feel, as well as a rigid stringy appearance. The meat treated with the phosphate composition showed signs of heavy moisture loss and spongy, gritty, slimy mouth feel, and it appeared smooth and over-processed. The meat treated with the liquid brine composition had very little to no weeping or loss of moisture, and it had a natural appearance. Even after cooking and freezing, it was similar in appearance to the cooked samples that were not frozen. It was also observed that the meat treated with the liquid brine composition did not have the warmed-over flavor associated with freezing and thawing meats. Accordingly, the meat treated with the liquid brine composition held up through the initial processing; cooking, freezing, thawing and reheating. The meat treated according to the method of the present invention out-performed the other samples in the observed areas of measurement.

Ready-to-Eat Simulation

A simulation of a ready-to-eat product, like a burrito or chicken dinner, which would be fully cooked at a processor, followed by freezing and re-cooking in a microwave or conventional oven, was also performed. The frozen, cubed chicken was either microwave for 1 to 3 minutes, or cooked for 6-8 minutes in a conventional oven set at 325° F.

After either microwaving or cooking, the untreated meat had a stringy and dried-out appearance, and was very tough to chew. After either microwaving or cooking, the meat treated with the phosphate composition had a processed look and a gritty texture when chewed. Additionally, a lot of the moisture had released from the chicken breast and was in the bottom of the cooking tray. The meat treated with the liquid brine composition had very little to no moisture loss after reheating. Again, the meat did not have the warmed-over flavor that is commonly associated with frozen, thawed and reheated meat, it held its natural appearance, juiciness, tenderness and overall integrity whether cooked in a microwave or conventional oven.

Example 3: Machine Tumbling without Vacuum

This example demonstrates that the aqueous solution is functional when tumbled with meat in the absence of vacuum. 250 pounds of boneless, skinless chicken breast pieces were either: untreated, marinated in a 20% solution of phosphate composition or marinated in a 20% solution of the present invention liquid brine composition.

The chicken containing either solution was then placed into a tumbler. The chicken was tumbled at 6 to 10 revolutions per minute in a 500 pound tumbler for about 30 minutes. The 250 lbs of chicken treated with the phosphate composition came out of the tumbler with 59.75% of the solution not being absorbed into the meat. In contrast, even in the absence of vacuum, the meat treated with the present invention liquid brine composition absorbed 97.46% into the meat.

Example 4: Hand Tumbling without Vacuum

This example demonstrates that even with no vacuum and hand tumbling, the meat treated with the higher pH aqueous solution absorbed into the meat. Hand tumbling means hand massaging the meat by flipping it over from one end to another, ensuring that the solution covers all parts. Hand massaging simulates the action of an industrial tumbler.

In this example, chicken breast were untreated, marinated with a 20% solution of phosphate composition, or marinated with a 20% solution of the liquid brine composition of the present invention. Each solution was hand massaged into the meat for 8-10 minutes. The meat was then allowed to soak in the remaining marinade for about 20 minutes. Only about 25% of the phosphate composition absorbed into the meat, leaving a significant amount of solution remaining Using the liquid brine composition of the present invention, 99.38% of the solution was absorbed; no free moisture remained in the bowl.

Example 5: Pork Loin Chops Roast Injected with an Aqueous Solution

In this example, 0.25 pounds of the dry composition ingredients were added to ten pounds of water (in the form of eight pounds of water plus two pounds of ice) to achieve an addition rate of 20% and an ingoing percent of 0.48%: where:

$$\frac{X}{X+Z} \times \text{percent addition rate} = \text{ingoing percentage}$$

wherein X is the amount of dry ingredients;
wherein Z is the amount of aqueous liquid to be used.
Accordingly, $$\frac{.25}{0.25 + 8 \text{ lbs aqueous liquid} + 2 \text{ pounds ice}} \times 20\% = 0.487\%$$

$$\frac{.25}{10.2 \text{ lbs aqueous composition}} \times 20\% = 0.487\%$$

The liquid brine composition temperature was 34° F. during mixing. The ingredients were mixed in the solution until all the ingredients were dissolved. The aqueous solution was then left for 15-20 minutes. During mixing and preparation, the p1-1 of the present invention liquid brine composition fluctuated, but the final pH was about 10.7.

TABLE 3

Injected Pork Loin Chops or Pork Roast - Refrigerated and Frozen

| Type of Meat | Desired Addition Rate | LBS of ingredients per 10 lbs of Water | Ingoing Percent of dry ingredients |
|---|---|---|---|
| 4 oz Pork Loin Chop | 20% | 0.25 | 0.487% |
| 6 oz Pork Loin Chop | 18% | 0.3 | 0.524% |
| 8 oz Pork Loin Chop | 15% | 0.8 | 1.296% |
| 16 oz Pork Roast | 12% | 1.2 | 1.286% |
| 32 oz Pork Roast | 10% | 1.1 | 0.991% |

TABLE 4

Pork Loin Example

| | Phosphate Composition Pounds | Present Invention Composition Pounds |
|---|---|---|
| Water | 25 | 25 |
| Salt | 1.22 | 1.22 |
| Sugar | 0.55 | 0.55 |
| Natural Flavoring | 0.73 | 0.73 |
| Sodium Phosphate | 0.61 | 0.00 |
| Sodium Carbonate | 0.00 | 0.24 |
| TOTAL | 23.12 | 27.75 |
| pH | pH 9.2 | pH 10.7 |

A total of 1.5 pounds of each solution from Table 4 was added to each pork loin sample for the examples below.

Two whole pork loins were injected with the present invention and a water, salt, phosphate aqueous solution. Both pork loins weighed approximately 6.5 pounds before treatment and weighed approximately 8 pounds after treatment. Each whole pork loin was cut into 4 roast weighing 2 pounds. Two of the loins were frozen, while the other two were refrigerated for further processing for 24 hours.

The pork loins that were injected with a 23% solution of the liquid brine composition showed very little to no weeping or moisture loss in the holding tray. On the other hand, the meat treated with the phosphate composition left moisture and juices in the holding tray. Both roasts were placed on a roasting rack and cooked to an internal temperature of 162° F. The meat was then removed from the oven and allowed to stand for 15 minutes. At this time, the meat was sliced into ¼ inch portions. The meat injected with the present invention liquid brine composition exhibited very little weeping or juice loss. Additionally, the mouth feel and tenderness of the meat was natural and more appealing. The meat treated with the phosphate composition had a gritty, processed like appearance after slicing. There were also large amounts of purge or cook-off in the bottom of the cooking tray using the phosphate composition. The pork loin treated with the present invention liquid brine composition had more noticeable moisture in the cooked meat than the phosphate composition treated meat.

The frozen pork roasts were kept frozen for 7 days, and then thawed to about 36° F. The meat that had been treated with the present invention liquid brine composition had significantly less moisture in the holding tray after thawing than did the meat treated with the Phosphate Composition. The roasts were then cooked in a conventional oven to an internal temperature of 162° F. The roasts were then removed from the oven and allowed to cool for about 15 minutes. The roasts were then sliced into ¼ inch portions. The roast treated with the phosphate composition had significant moisture loss during cooking and after cooling. It also had a warmed-over flavor and a gritty mouth feel. The meat treated with the present invention liquid brine composition showed very little weeping or juice loss during cooking. Additionally, the mouth feel and tenderness of the roast treated with the present invention liquid brine composition was more appealing and the roast held its natural flavor during the freezing-thawing-cooking processes.

Example 6: Beef Strip Loin

In this example, beef strip loin was selected, which is a widely used meat cut with versatility for both premium grades steaks and lower utility steaks. The meat weight prior to treatment was 12.5 lbs. After injection, it was about 15 lbs, which calculates to a 20% addition rate. Sodium carbonate was used at 0.035 lbs per 12.5 lbs of meat, and low sodium sea salt was used at 0.016 lbs per meat. In addition, turbinado sugar was used at 0.00825 lbs per 12.5 lbs of meat and natural flavoring was added at 0.00335 lbs per 12.5 lbs of meat. The ingredients were dissolved in 2.437 pounds of water, forming 2.5 lbs of liquid brine composition.

The below calculation extrapolates the relationship of pounds into parts per million and ingoing percentage of the composition.

(12.5 lbs×20%)−0.06261=2.437 lbs aqueous liquid

Where, $$\frac{X}{X+Z} \times \text{percent addition rate} = \text{ingoing percentage}$$

wherein X is the amount of dry ingredients;
wherein Z is the amount of aqueous liquid to be used.
Therefore, $$\frac{.06261 \text{ lb ingredients}}{.06261 \text{ lb ingredients} + 2.4374 \text{ aqueous liquid}} \times 20\% = .5008\%$$

For comparison, ingredient/meat weight=ppm (parts per million) or ingoing percentage.

$$\frac{.035 \text{ lb sodium carbonate}}{12.5 \text{ lbs of meat}} = 2800 \text{ ppm}$$

$$\frac{.016 \text{ lb low sodium sea salt}}{12.5 \text{ lbs of meat}} = 1280 \text{ ppm}$$

$$\frac{.00825 \text{ lb turbinado sugar}}{12.5 \text{ lbs of meat}} = 660 \text{ ppm}$$

$$\frac{.0035 \text{ lb natural flavoring}}{12.5 \text{ lbs of meat}} = 268 \text{ ppm}$$

Total, $$\frac{.006261 \text{ lb ingredients}}{12.5 \text{ lbs of meat}} = 5008 \text{ ppm}$$

Therefore,
5008 ppm is equal to 0.5008% ingoing percentage.

Low Sodium Sea Salt Performance

When using the low sodium sea salt, the total amount of sodium present nutritionally in the treated meat is reduced by at least 40%, and there is no loss in "performance" of the meat. More particularly, this unique combination of sodium carbonate and low sodium sea salt results in similar benefits of moisture retention and color of the meat during storage and increased cooked yields when compared to table salt. Meat treated with the liquid brine composition of the present invention out performed untreated meat. Accordingly, the method of the present invention results in a superior processed meat product with better nutritional value, since it has significantly lower sodium, and also includes trace minerals found in sea salt.

Example 7: "Naturally Cured" Ham

The meat industry desires processed meat products that are cured without the use of nitrites. Naturally cured meats have a similar pink hue and flavor aspects to them as traditionally cured meats. Typically, naturally cured meats are phosphate free, so the entire ingredient declaration on a consumer meat product package would list nothing but natural ingredients. Furthermore, naturally cured meats also usually include a "cure accelerator", such as erythorbate to help aid the color curing process. In the case of a naturally cured meat, one would exclude sodium erythorbate from the process and use a natural curing aid, such as cherry powder. The challenge for meat processors is maintaining yields for the naturally cured meats without the use of phosphates.

The methods of the present invention, can meet these meat industry demands.

TABLE 5

Exemplary Liquid Brine Composition for Naturally Curing Ham

| Ingredients | Parts per 100 parts of Uncooked, Untreated Meat |
| --- | --- |
| Sodium Carbonate | 0.1 to 0.5 parts |
| Saccharide (Evaporated Cane Sugar) | 0.5 to 2.5 parts |
| Sea Salt | 0.1 to 3 parts |
| Celery Powder | 0.25 to 0.55 parts |
| Cherry Powder | 0.10 to 0.35 parts |
| Natural Flavoring (Rosemary Extract) | 0.001 to 0.1 parts |

TABLE 5-continued

Exemplary Liquid Brine Composition for Naturally Curing Ham

| Ingredients | Parts per 100 parts of Uncooked, Untreated Meat |
| --- | --- |
| Water | Sufficient for Dilution for 10%-30% addition rate to untreated meat |

By way of example, ham is naturally cured using the methods of the present invention. For a 23% addition rate, 100 pounds of untreated ham may be treated with 18.689 parts of water, 2 parts of sea salt, 0.5 parts of low sodium sea salt, 1 part evaporated cane sugar, 0.4 parts celery powder, 0.2 parts cherry powder, 0.21 parts sodium carbonate and 0.001 parts natural flavoring. This liquid brine composition has a pH above 10.1 and al the ingredients are natural. Using the methods of the present invention, the naturally cured ham meets or exceeds yield expectations, even though it is phosphate free.

The percentage of ingredients in the above example can be expressed as follows:

| | |
| --- | --- |
| Water | 81.256% |
| Salt | 8.695% |
| Evaporated Cane Sugar | 4.347% |
| Low Sodium Sea Salt | 2.174% |
| Celery Powder | 1.739% |
| Cherry Powder | 0.869% |
| Sodium Carbonate | 0.913% |
| Natural Flavoring | 0.000043% |
| Total | 100% |

The examples set forth above are provided to give those of ordinary skill in the art with a complete disclosure and description of how to make and use the preferred embodiments of the compositions, and are not intended to limit the scope of what the inventors regard as their invention. Modifications of the above-described modes (for carrying out the invention that are obvious to persons of skill in the art) are intended to be within the scope of the following claims. All publications, patents, and patent applications cited in this specification are incorporated herein by reference as if each such publication, patent or patent application were specifically and individually indicated to he incorporated herein by reference.

What is claimed is:

1. A method for processing an uncooked, untreated meat comprising the steps of:
   (a) preparing an aqueous solution comprising
      (i) sodium carbonate at a concentration of about 0.06 molar;
      (ii) salt at a concentration of about 1 molar; and
      (iii) natural flavoring in an amount of less than 0.0045 parts per 100 parts of the uncooked, untreated meat; and
      (iv) liquid;
      wherein the aqueous solution has a pH of at least 10.5;
   (b) providing a portion of the uncooked, untreated meat; and
   (c) treating the uncooked, untreated meat with the aqueous solution using injection and tumbling.

2. The method of claim 1, further comprising a saccharide at a concentration of less than 3 molar.

3. The method of claim 2, wherein the concentration of saccharide is between 0.004 and 2.9 molar.

4. The method of claim 1, wherein the aqueous solution further comprises additional ingredients selected from the group consisting of: a natural flavoring, a flavoring, a spice, a spice extractive, a carrageenan, an antioxidant, a vinegar, a curing agent, a curing accelerator, and a coloring agent.

5. The method of claim 1, wherein the uncooked, untreated meat is selected from the group consisting of: poultry, lamb, beef, and pork.

6. A method for treating for treating uncooked, untreated meat comprising the steps of:
  (1) preparing an aqueous solution comprising:
    (a) sodium carbonate at a concentration of about 0.06 molar;
    (b) salt at a concentration of about 1 molar;
    (c) saccharide at 0.5 to 2.5 parts per 100 parts of the uncooked, untreated meat;
    (d) rosemary extract at 0.001 to 0.1 parts per 100 parts of the uncooked, untreated meat;
    (e) celery powder at 0.25 to 0.55 parts per 100 parts of the uncooked, untreated meat;
    (f) cherry powder at 0.1 to 0.35 parts per 100 parts of the uncooked, untreated meat; and
    (g) liquid; and
    wherein the aqueous solution has a pH of at least 10.5;
  (2) providing a portion of the uncooked, untreated meat; and
  (3) treating the uncooked, untreated meat with the aqueous solution using injection and tumbling.

7. The method of claim 6, wherein the aqueous solution further comprises additional ingredients selected from the group consisting of: a natural flavoring, a flavoring, a spice, a spice extractive, a carrageenan, an antioxidant, a vinegar, a curing agent, a curing accelerator, and a coloring agent.

8. The method of claim 6, wherein the uncooked, untreated meat is selected from the group consisting of: poultry, lamb, beef, and pork.

9. The method of claim 4, wherein the natural flavoring is rosemary.

10. The method of claim 4, wherein the curing agent is celery juice or celery powder.

11. The method of claim 4, wherein the curing accelerator is cherry powder.

12. The method of claim 1, wherein the liquid is water.

13. The method of claim 1, wherein the uncooked, untreated meat is tumbled for at least 30 minutes.

14. The method of claim 6, wherein the liquid is water.

15. The method of claim 6, wherein the uncooked, untreated meat is tumbled for at least 30 minutes.

* * * * *